UNITED STATES PATENT OFFICE 2,609,321

CRAZE RESISTANT RESINOUS COATING, COATED PRODUCT, AND PROCESS OF MAKING IT

Donald G. Patterson, Darien, Conn., assignor to American Cyanamid Company, New York, N. Y., a corporation of Maine No Drawing. Application May 7, 1948, Serial No. 25,806

10 Claims. (Cl. 154—121)

This invention relates to a craze resistant resinous coating, a coated product, and the process of making it.

This application is a continuation-in-part of Serial No. 575,572, filed January 31, 1945, now abandoned.

Laminated materials have previously been made by first producing a core or base, preferably paper laminated with a synthetic resin, usually phenol-formaldehyde resin, and thereafter applying a surface coating of thermosetting aminoplastic resin selected from the group consisting of urea-formaldehyde resins and melamine-formaldehyde resins. Frequently, this coated sheet is superimposed upon a plurality of phenolic impregnated plies, and the whole assembly cured and bonded in one single operation. Often one or more sheets of paper impregnated with one or more of the thermosetting aminoplastic resins is included in the surface coating. Many of these laminated materials have been found to craze, and many attempts have been made to prevent this by the use of modifiers, such as plasticizers, for the urea-formaldehyde and melamine-formaldehyde resins. The use of paper fibers has been proposed by Cochrane, U. S. Patent No. 2,038,345, and Guhl, U. S. Patent No. 2,292,118. None of the products heretofore employed have been free from crazing, particularly when such products have been subjected to varying atmospheric conditions, particularly variations in temperature and humidity conditions, over a relatively long period of time. In other words, many products have been prepared which do not craze initially, but which do craze after a relatively short period of use.

An object of the present invention, therefore, is to provide laminated materials having a coating thereon, which will not craze under variations of atmospheric conditions, such as temperature and humidity. Another object of the present invention is to provide a process for preparing laminated materials to produce a craze resistant surface on a surface thereof. A still further object of the present invention is to provide a craze resistant resinous coating. Included within the scope of the present invention, is the object to produce laminated materials having surfaces which do not exhibit cracking or crazing, even after exposure to varying atmospheric conditions.

The foregoing and other objects of this invention are obtained by incorporating glass fibers into a thermosetting aminoplastic coating composition selected from the group consisting of melamine-formaldehyde and urea-formaldehyde resins dispersed in a volatile vehicle, which may or may not have pigment incorporated therein; and, applying this composition to a fibrous sheet and curing the composition on a core which may be preformed laminated material, or a plurality of laminae in assembled condition, ready for bonding. The coating composition may also be applied to a preformed fibrous laminated material in the absence of an additional coating surface sheet. It is more convenient, however, to employ a carrier sheet in preparing a surfaced core.

The following examples in which the proportions are in parts by weight, are given wholly by way as illustration, and not in limitation.

Example 1

Twenty-four (24) parts of a melamine-formaldehyde resin (Resin "A"), 8 parts of glass fiber, 8 parts of titanium dioxide, 36 parts of ethanol, and 24 parts of water were blended together and ground in a pebble mill for about 6–18 hours to produce a homogeneous coating composition.

A composition prepared in accordance with the foregoing description is sprayed on to the surface of a paper laminate which is bonded together with a phenol-formaldehyde resin. The coated laminate is placed in an oven to dry for about 10 minutes at 105° C. and for 45 minutes at 125° C. The laminate surface is then cured by pressing at 1100 p. s. i. and at 150° C. for about 20 minutes. A smooth, craze resistant, glossy white surfaced laminate is obtained. Even after several cycles of alternate exposure of the laminate to steam for one-half hour, and to a temperature of 105° C. in an oven for one-half hour, the laminate shows no crazing visible to the naked eye.

Example 2

Five (5) parts of melamine-formaldehyde resin (Resin "A"), 3 parts of glass fiber, 2 parts of titanium dioxide, 1.5 parts of butanol and 6 parts of water are blended together, ball milled to effect a smooth dispersion, and applied to a laminate and dried prior to curing the resin employed for bonding the laminate. After curing, both the surface and bonding resins in accordance with the procedure of Example 1, the laminate has a glossy, hard, craze resistant coating. It will withstand 10–15 cycles of the test described in Example 1 without crazing visible to the naked eye. No crazing is found after 7 days in a sweat box at 105° F. and 100% relative humidity, nor after 4 weeks in an oven at 105° C.

Example 3

A composition of 80 parts melamine-formaldehyde resin (1:2 mol ratio), 80 parts fine glass fibres, 40 parts titanium dioxide pigment, 385 parts water, and 15 parts n-butanol were dispersed by ball milling for 16 hours. This smooth paste obtained in this manner was coated on a pigmented alpha cellulose paper which had previously been impregnated with a melamine-formaldehyde resin solution and dried. The coated paper was dried for 8 minutes at 103° C. to remove the solvent. The coat spread of this composition was 20 grams per square foot of paper surface. The coated paper was then superimposed upon a plurality of phenolic resin impregnated Kraft paper plies and the assembly united under heat and pressure of 150° C. and 1100 p. s. i. for 10 minutes. The laminate obtained in this manner was satisfactorily united and bonded and had a surface of excellent smooth gloss, having no cracks or crazes, and, after being subjected to the test of alternating exposure in steam at atmospheric pressure and dry heat at 105° C., 15 minutes in each condition and repeated for 10 cycles, there was no visible crazing or cracking after 10 cycles.

Where hard pigments are used, the pigment may be ground in the resin prior to grinding in the glass flock.

The surface coating may be applied either before or after the laminate is bonded together by curing the resin with which the plies of the laminate are impregnated.

Preparation of Resin "A"

Eighteen hundred fifty (1850) parts of formalin (37% formaldehyde) and 1390 parts of melamine are charged into a suitable reaction vessel provided with an agitator and a reflux condenser. The pH of the mixture is adjusted to 7 with sodium hydroxide and the mixture is then heated to reflux, approximately 94° C. Thirty (30) minutes after reaching reflux, the mixture is cooled to 75° C. and the pH is adjusted to 10 with sodium hydroxide. About 10 parts of a filter-aid are added and the mixture is filtered, after which the filtrate is placed in an evaporator and the pressure reduced to about 9–10 inches of mercury absolute pressure. The syrup in the evaporator is then heated to boiling, and when the temperature of the syrup reaches about 107° C.–108° C. it is discharged into trays and cooled at about 13° C. until a hard resin is obtained. The resin is ground to form a fine powder.

In place of the melamine-formaldehyde resin used in the preceding examples, we may employ other melamine-formaldehyde condensation products containing 1 or more mols of formaldehyde per mol of melamine. In order to obtain products which have especially high chemical resistance and good physical properties, it is preferable that the formaldehyde melamine ratio be between about 1.5:1.0 and 3.5:1.0. Urea-formaldehyde resins may also be used in accordance with this invention and those having a formaldehyde-ratio between about 1.3:1 and 2:1 are suitable. Resins suitable for this invention are those which are soluble in water or alcohol or in mixtures thereof.

Glass fibers having diameters ranging from about 4–11 microns may be used in the above example. When such fibers are used, the weight ratio of resin to glass is preferably between about 1:1 and 9:1, but when fibers of smaller diameter are used, the ratio of glass to resin may be reduced and yet obtain similar results. With fibers having a diameter of less than 4 microns, the weight ratio of glass to resin may be as low as 1:99, although generally, it will be found desirable to employ weight ratios of glass to resin near 1:10, and preferably not less than 1:35. For optimum results, the glass fibers should be free from lubricant, which exists as a result of the same fiber manufactures. If the lubricant interferes with adhesion of resin to the glass fibers, a good surface is not obtained, and, therefore, the glass should be cleaned, as for example by stoving or by extraction with carbon tetrachloride or heat-treating. Such cleaning is not necessary, however, when lubricant free fibers are obtained and used.

This invention may be practiced with or without pigment. Since, however, most applications of the present invention require pigmented surfaces, and since pigmented surface films are most susceptible to surface cracking or crazing, the amount of pigment employed should be used with discretion. It is quite true that large proportions of pigment may be employed in the compositions of the present invention, but from an economical viewpoint, as well as from a practical viewpoint, it is desirable that not more than 1 part of pigment be employed per part of resin, and for optimum results with respect to craze resistance, hiding coverage and character and quality of surface, it is desirable to employ 0.4 to 0.6 parts of pigment per part of resin. When a relatively small proportion of glass fibers are employed, for example, less than 10%, based on the weight of resin, it is preferable, if not essential, that small diameter glass fibers be employed, i. e., those fibers having a diameter less than 4 microns, and that a relatively low ratio of pigment to resin be employed. Satisfactory results are obtained in these low fiber compositions, wherein the pigment is approximately 20%, based on the weight of resin.

The coating compositions produced in accordance with this invention may contain a wide variety of dyes, pigments or fillers in addition to the melamine-formaldehyde resins and glass fibers. By varying the pigments and dyes, it is possible to obtain many different colored materials.

While this invention has been described particularly with reference to the application of these coating compositions to a preform laminate bonded with phenol-formaldehyde resin, it may also be used as an impregnating material for paper to form a laminate bonded solely with the composition. For economy reasons, it is generally desirable, however, to use a base material which is bonded with a phenol-formaldehyde resin, a urea-formaldehyde resin or with some other relatively inexpensive resin, but any resin suitable for bonding the plies of a laminate may be used.

This invention is suitable for use in the manufacture of laminate materials for many different purposes, among which table tops, sinks, dishes, trays, refrigerator panels are but a few examples.

These coating compositions may be applied to pulp preforms or to laminated materials, the resin bond of which is cured or uncured, by spraying, by roll coating, or by any other suitable means. They may be applied not only to paper laminates but also to plywood or laminates containing cloth. These coating compositions may also be applied to a fibrous carrier sheet, preferably thermosetting resin impregnated paper, and employ this coated sheet to surface any suitable core, such as fibrous laminates, pressed wood, and the like.

The term "crazing" as used herein is intended to denote the surface cracks visible to the naked eye, but does not include any fine cracks or lines which are not visible to the naked eye but which may be seen under microscopical examination.

Obviously, many modifications and variations in these processes and compositions may be made without departing from the spirit and scope of the invention as defined in the appended claims.

I claim:

1. A process for producing a laminated product having a craze resistant surface which comprises applying to the surface sheet of a laminate a thermosetting synthetic resin selected from the group consisting of urea-formaldehyde resins and melamine-formaldehyde resins, pigment and glass fibers in a volatile vehicle, drying said surface sheet and applying heat and pressure to said coating surface to produce a body having a substantial insoluble, infusible, craze resistant continuous film on the surface thereof, wherein said volatile vehicle is a solvent for the resin selected from the group consisting of water and an alcohol and is present in a weight ratio of said vehicle to said resin of between 1.5:1 to 5:1, and wherein said glass fibers and said resin are present in a weight ratio between 1:1 and 1:9, respectively, and wherein said glass fibers have a diameter of between 4–11 microns.

2. A process for producing a laminated product having a craze resistant surface which comprises applying to a laminate, a surface sheet coated with a melamine-formaldehyde resin and glass fibers in a volatile vehicle, drying said sheet and consolidating the assembly under heat and pressure to produce a body having a substantial insoluble, infusible, craze-resistant, continuous film on its surface, wherein said volatile vehicle is a solvent for the resin selected from the group consisting of water and an alcohol and is present in a weight ratio of said vehicle to said resin of between 1.5:1 to 5:1, and wherein said glass fibers and resin are present in a weight ratio of between 1:1 and 1:9, respectively, and wherein said glass fibers have a diameter of between 4–11 microns.

3. A process for producing a laminated product having a craze resistant surface which comprises applying to a laminate, a surface sheet coated with a melamine-formaldehyde resin and glass fibers in a volatile vehicle, drying said sheet and consolidating the assembly under heat and pressure to produce a body having a substantial insoluble, infusible, craze-resistant, continuous film on its surface, wherein said volatile vehicle is a solvent for the resin selected from the group consisting of water and an alcohol and is present in a weight ratio of said vehicle to said resin of between 1.5:1 to 5:1, and wherein said glass fibers and resin are present in a weight ratio of between 1:1 and 1:9, respectively, and wherein said glass fibers have a diameter of between 4–11 microns, and wherein said melamine-formaldehyde resin has a mol ratio of 1.5–3.5 mols of formaldehyde per mol of melamine.

4. A process for producing a laminated product having a craze resistant surface, which comprises applying to a surface sheet of a laminate, a melamine-formaldehyde resin and glass fibers dispersed in an aqueous solution of ethanol, drying said surface sheet, and applying heat and pressure to said coated surface to produce a body having a substantial insoluble, infusible, craze-resistant continuous film on the surface thereof, wherein said glass fibers and said resin are present in a weight ratio between 1:1 and 1:9, wherein said glass fibers have a diameter size of between 4–11 microns and wherein the weight ratio of the resin to the aqueous solution of ethanol is 1:2.5, respectively.

5. A sheet of cellulosic fibrous material coated with a melamine-formaldehyde resin and glass fibers dispersed in a volatile vehicle selected from the group consisting of water and an alcohol wherein the weight ratio of said vehicle to said resin is between 1.5:1 and 5:1 and wherein said fibers have a diameter of between 4–11 microns and are present in a weight ratio with said resin of between 1:1 and 1:9, respectively.

6. A sheet of cellulosic fibrous material coated with a melamine-formaldehyde resin and glass fibers dispersed in a volatile vehicle comprising an aqueous solution of ethanol, wherein the weight ratio of said vehicle to said resin is 2.5:1 and wherein said fibers have a diameter of between 4–11 microns and are present in a weight ratio with said resin of between 1:1 and 1:9, respectively.

7. A paper laminate having an exterior surface thereof coated with a composition comprising a melamine-formaldehyde resin and glass fibers wherein said glass fibers have a diameter of between 4–11 microns and wherein said resin and said glass fibers are present in a weight ratio of 1:1 and 9:1, respectively.

8. A resinous composition adapted to form a hard, craze-resistant coating on the surface of laminated articles comprising a uniform mixture of melamine-formaldehyde resin and glass fibers dispersed in a volatile vehicle selected from the group consisting of water and an alcohol, wherein the weight ratio of vehicle to resin is between 1.5:1 to 5:1, wherein said glass fibers have a diameter of between 4–11 microns and wherein the weight ratio of said resin to said fibers is between 1:1 to 9:1, respectively.

9. A resinous composition adapted to form a hard, craze-resistant coating on the surface of laminated articles comprising a uniform mixture of melamine-formaldehyde resin and glass fibers dispersed in a volatile vehicle comprising an aqueous solution of ethanol, wherein the weight ratio of vehicle to resin is 2.5:1, respectively, wherein said glass fibers have a diameter of between 4–11 microns and wherein the weight ratio of said resin to said fibers is between 1:1 and 9:1, respectively.

10. A process for producing a laminated product having a craze resistant surface which comprises applying to the surface sheet of a laminate a thermosetting synthetic resin selected from the group consisting of urea-formaldehyde resins and melamine-formaldehyde resins, and glass fibers in a volatile vehicle, drying said surface sheet and applying heat and pressure to said coating surface to produce a body having a substantial insoluble, infusible, craze resistant continuous film on the surface thereof, wherein said volatile vehicle is a solvent for the resin selected from the group consisting of water and an alcohol and is present in a weight ratio of said vehicle to said resin of between 1.5:1 to 5:1, and wherein said glass fibers and said resin are present in a weight ratio between 1:1 and 1:9, respectively, and wherein said glass fibers have a diameter of between 4-11 microns.

DONALD G. PATTERSON.

REFERENCES CITED

The following references are of record in the file of this patent:

UNITED STATES PATENTS

| Number | Name | Date |
|---|---|---|
| 2,176,837 | Ellis | Oct. 17, 1939 |
| 2,290,133 | Swain et al. | July 14, 1942 |
| 2,292,118 | Guhl | Aug. 4, 1942 |
| 2,344,733 | Ripper | Mar. 21, 1944 |
| 2,377,867 | D'Alelio | June 12, 1945 |
| 2,385,384 | Schroy | Sept. 25, 1945 |
| 2,428,654 | Collins | Oct. 7, 1947 |

OTHER REFERENCES

Modern Plastics reprint, vol. 21, No. 9 (May 1944), pages particularly cited 89-93, 102-104.